United States Patent
Armstrong et al.

(10) Patent No.: US 8,521,812 B2
(45) Date of Patent: Aug. 27, 2013

(54) ACCESSING LOCAL NETWORK RESOURCES IN A MULTI-INTERFACE SYSTEM

(75) Inventors: Nicholas Armstrong, Waterloo (CA); Jakub Schmidtke, Waterloo (CA); Robert Robinson, Waterloo (CA); Severn Tsui, Waterloo (CA)

(73) Assignee: Pravala Inc., Kitchener, ON (CA)

( * ) Notice: Subject to any disclaimer, the term of this patent is extended or adjusted under 35 U.S.C. 154(b) by 154 days.

(21) Appl. No.: 13/245,423

(22) Filed: Sep. 26, 2011

(65) Prior Publication Data

US 2012/0254464 A1    Oct. 4, 2012

Related U.S. Application Data

(60) Provisional application No. 61/386,139, filed on Sep. 24, 2010.

(51) Int. Cl.
*H04L 12/56* (2006.01)
*H04L 12/28* (2006.01)

(52) U.S. Cl.
USPC ........... 709/203; 709/238; 370/328; 370/400; 370/401

(58) Field of Classification Search
USPC .................. 709/203, 238; 370/328, 400, 401
See application file for complete search history.

(56) References Cited

U.S. PATENT DOCUMENTS

| | | | |
|---|---|---|---|
| 2004/0170181 A1* | 9/2004 | Bogdon et al. | 370/400 |
| 2004/0264402 A9* | 12/2004 | Whitmore et al. | 370/328 |
| 2006/0187956 A1 | 8/2006 | Doviak et al. | |
| 2009/0067441 A1 | 3/2009 | Ansari et al. | |
| 2012/0254464 A1* | 10/2012 | Armstrong et al. | 709/238 |

OTHER PUBLICATIONS

International Search Report issued by the Canadian Intellectual Property Office dated Dec. 6, 2011 for corresponding International Application No. PCT/CA2011/001078.
Written Opinion of the International Searching Authority issued by the Canadian Intellectual Property Office dated Dec. 6, 2011 for corresponding International Application No. PCT/CA2011/001078.
International Search Report of the PCT, Dec. 1, 2011.

* cited by examiner

*Primary Examiner* — Khanh Dinh
(74) *Attorney, Agent, or Firm* — Jonathan Pollack

(57) ABSTRACT

A method is provided for selectively routing data packets on a client device having of plurality of network interfaces for communicating over a network. The method comprising the following steps. It is determined if the data packets should be routed to a network server accessible by a corresponding one of the network interfaces to access local resources offered thereon. If the data packets should be routed to the network server, the data packets are routed directly to the network server via the corresponding network interface. Otherwise, the data packets are routed via a default route. A client device configured to implement the method is also provided.

9 Claims, 4 Drawing Sheets

ACCESSING LOCAL NETWORK RESOURCES IN A MULTI-INTERFACE SYSTEM

The present invention relates generally to multi-interface communication systems and specifically to accessing network resources that are not available over a default network interface when implementing such systems.

BACKGROUND

Multi-interface communication systems allow client devices to use multiple network interfaces as if they were a single network interface. This is achieved by providing a network component that acts as an agent for the client device. The client device can be configured to use any number of network interfaces at the same time, as well as move traffic between interfaces.

Examples of multi-interface communication systems are provided in U.S. patent application Ser. No. 13/004,652, titled "Communication Between Client and Server Using Multiple Networks" by Manku et al. (hereafter referred to as "Manku") and U.S. Pat. No. 7,539,175, titled "Multi-Access Terminal with Capability for Simultaneous Connectivity to Multiple Communication Channels" by White et al.

In the multi-interface communication system, network traffic generated by applications running on the client device, or network traffic generated by other systems that is routed through the client device, is directed to a virtual network interface using routing rules. The traffic is encapsulated using one of a number of different encapsulation protocols. Using one of a variety of scheduling algorithms, the encapsulated traffic is sent out on one or more of the network interfaces, destined for an endpoint of the system. In many cases, this endpoint is in a different network location than a traditional network endpoint, had the client device used the network interface directly, as is standard in the art. Unfortunately, this process prevents the client device from accessing network resources that are only accessible via networks that are connected to one of the non-default network interfaces independent of the encapsulation system. These resources are termed local resources. Examples of local resources include captive portals, protected servers, application marketplaces, network information pages, and many others.

SUMMARY OF THE INVENTION

The present invention allows applications on clients running multi-interface software or hardware, or unmodified client devices located behind a client router running multi-interface software or hardware, to readily access resources that are only accessible through a network interface that is not the default interface for the system without requiring the application to have a specialized configuration.

In accordance with an aspect of the present invention, there is provided a method by which local network resources can be accessed transparently by applications in a multi-interface network encapsulation system.

Also in accordance with a further aspect of the present invention, there is provided a method by which local network resources available on a non-default network interface can be accessed transparently by applications in a multi-interface operating system.

In accordance with an aspect of the present invention, there is provided a method for selectively routing data packets on a client device having of plurality of network interfaces for communicating over a network, the method comprising the steps of: determining if the data packets should be routed to a network server accessible by a corresponding one of the network interfaces to access local resources offered thereon; if the data packets should be routed to the network server, routing the data packet directly to the network server via the corresponding network interface; otherwise, routing the data packets via a default route.

BRIEF DESCRIPTION OF THE DRAWINGS

Embodiments of the present invention will now be described by way of example only with reference to the following drawings in which.

DETAILED DESCRIPTION OF THE PREFERRED EMBODIMENTS

Figure 1:
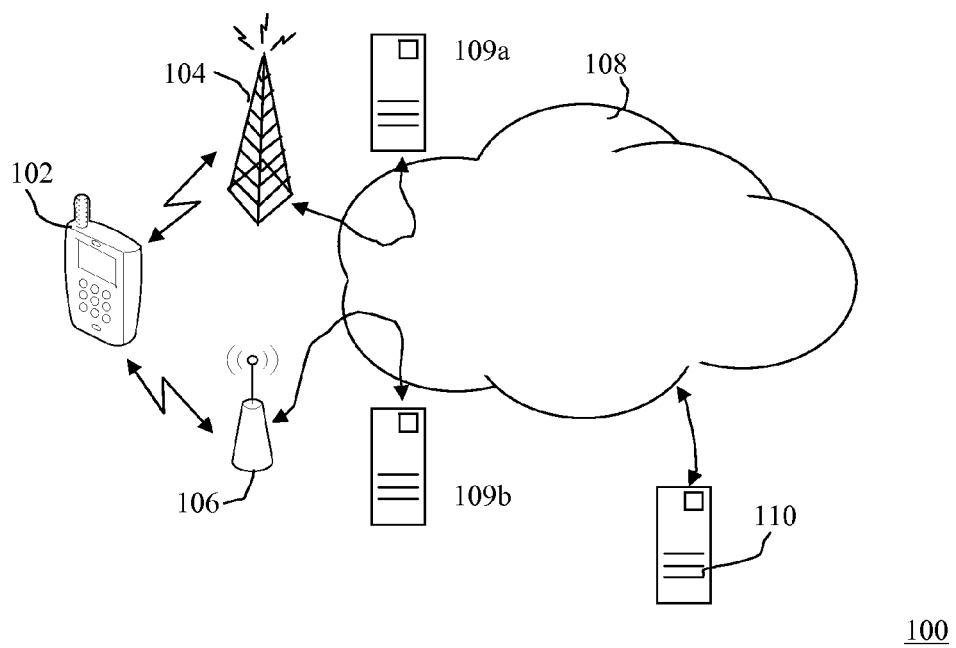
FIG. 1 is block diagram of a typical network environment.

For convenience, like numerals in the description refer to like structures in the drawings. Referring to FIG. 1, a standard network environment is illustrated generally by numeral 100. The network environment 100 comprises a client device 102, a first access point 104, a second access point 106, a network 108, first and second network servers 109*a* and 109*b*, and a target server 110. The client device 102 connects to the first network server 109*a* when using the first network access point 104, and the network server 109*a* is only available to client 102 when communicating using the first access point 104. That is, network server 109*a* cannot be accessed from the second access point 106. The client device 102 connects to the second network server 109*b* when using the second network access point 106, and the network server 109*b* is only available to client 102 when communicating using network access point 106. In this diagram, both network server 109*a* and network server 109*b* are examples of local network resources.

In the present embodiment, the network 108 is a Wide Area Network (WAN) such as the Internet. However, as is known the art, the network 108 can be comprised of a series of interconnected networks, depending on the implementation. In other scenarios, it may be a single network, a private network, or other non-typical network deployments.

The client device 102 can be a personal computing device such as a portable computer, tablet computer, smartphone, personal digital assistant (PDA) or the like. Alternatively, the client device 102 can be a computing device, such as a modem or a router, to which the personal computing device communicates. The client device 102 is configured with a first network interface and a second network interface for transmitting data to the first network server 109*a* and the second network server 109*b* via the first access point 104 and the second access point 106, respectively.

The first access point 104 and the second access point 106 can be any access points, such as Ethernet, Wi-Max, Digital Subscriber Loop (DSL), cable, satellite, cellular, Wi-Fi and the like. For ease of the explanation only, the first access point 104 is a cellular base station for communicating with the client device 102 over a cellular network. As is known in the art, the cellular base station 104 provides a data packet service such as GSM-based High Speed Packet Access (HSPA).

Similarly, for ease of explanation only, the second access point 106 is a Wi-Fi access point. The Wi-Fi access point 106 can be viewed as a Wireless Local Area Network (WLAN) that provides a gateway to the network 108.

The target server 110 is a remote computing device from which the client device 102 may request information and to which the client device 102 may transmit information via the network 108. The target server 110 may be a web server or any other device, such as a mail server, SIP server, and the like, connected to the network 108, with which the client device 102 wishes to communicate. Target server 110 is accessible via either the first access point 104 or the second access point 106.

Figure 2:
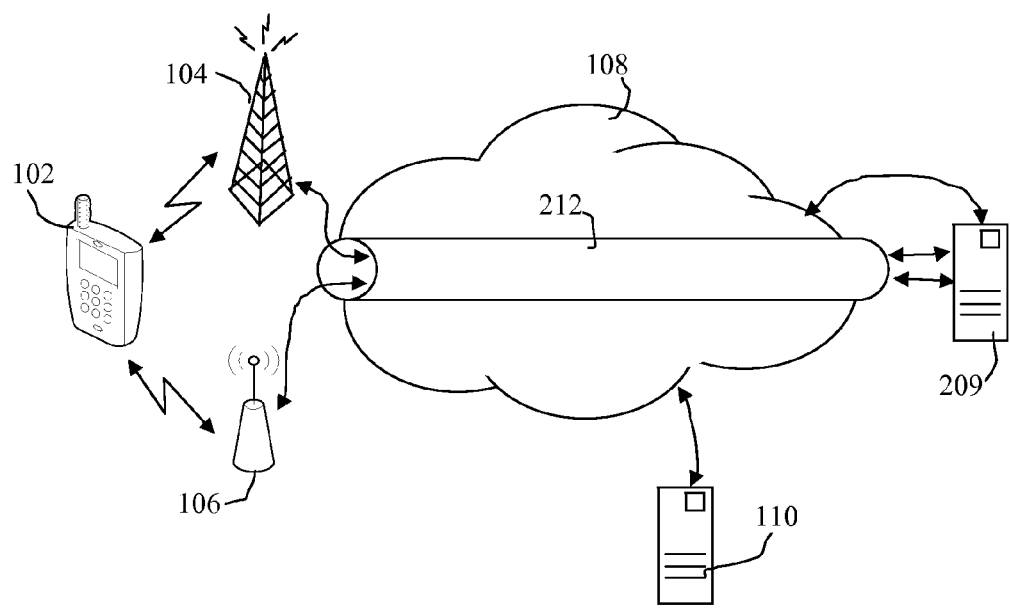
FIG. 2 is a block diagram of a multi-interface network environment.

Referring to FIG. 2, a multi-interface network environment as described by Manku is illustrated generally by numeral 200. The multi-interface network environment 200 further comprises a proxy server 209. The client device 102 can connect to the network 108 via one or both of the first network access point 104 or the second network access point 106 in order to communicate with the proxy server 209. Traffic is encapsulated by a virtual interface on the client device and scheduled for transmission using corresponding ones of the network interfaces. Since the data can be broken into packets or segments and scheduled for transmission to the proxy server 209 via both the first access point 104 and the second access point 106, the overall bandwidth available to the client device 102 can be improved.

The proxy server 209 is a server configured to receive data from the client device 102 via both the first access point 104 and the second access point 106, reassemble it, and transmit it to the target server 110. The proxy server 209 is also configured to receive data from the target server 110 and transmit it to the client device 102 via both the first access point 104 and the second access point 106.

It will be appreciated that a tunnel 212 is created between the client device 102 and the proxy server 209. The tunnel 212 includes the traffic sent over both the first access point 104 and the second access point 106. As such, the traffic in this implementation passes through the proxy server 209 before reaching the target server 110. The traffic is unable to reach the first or second network servers 109*a* and 109*b* as described with reference to FIG. 1 because proxy server 209 is not able to reach either network server 109*a* or 109*b*.

Thus local resources provided by the first and second network servers 109*a* and 109*b* may not be accessible to the client device. For example, consider that the second network server 109*b* implements a captive portal. Captive portals prevent traffic flow until predefined requirements are satisfied by the user, typically through their web browser. Accordingly, the captive portal can be used to deny the client device 102 access to the network 108 via the Wi-Fi access point 106 until the user enters validation credentials or payment information. If the data is unable to reach the second network server 109*b* because it is passing through a proxy server 209 that is not able to communicate with the second network server 109*b*, the client device 102 may not be able to pass data through the Wi-Fi access point 106 and it may not be apparent to the user why this is the case.

Thus, routing logic is provided at the virtual interface of the client device 102. The routing logic is configured to determine whether the traffic sent from an application executing on the personal computing device is to be encapsulated by the virtual interface and transmitted across one or more of the multiple interfaces or sent directly to the network interface 104 or 106 for transmission, thereby bypassing the encapsulation system.

Figure 3:
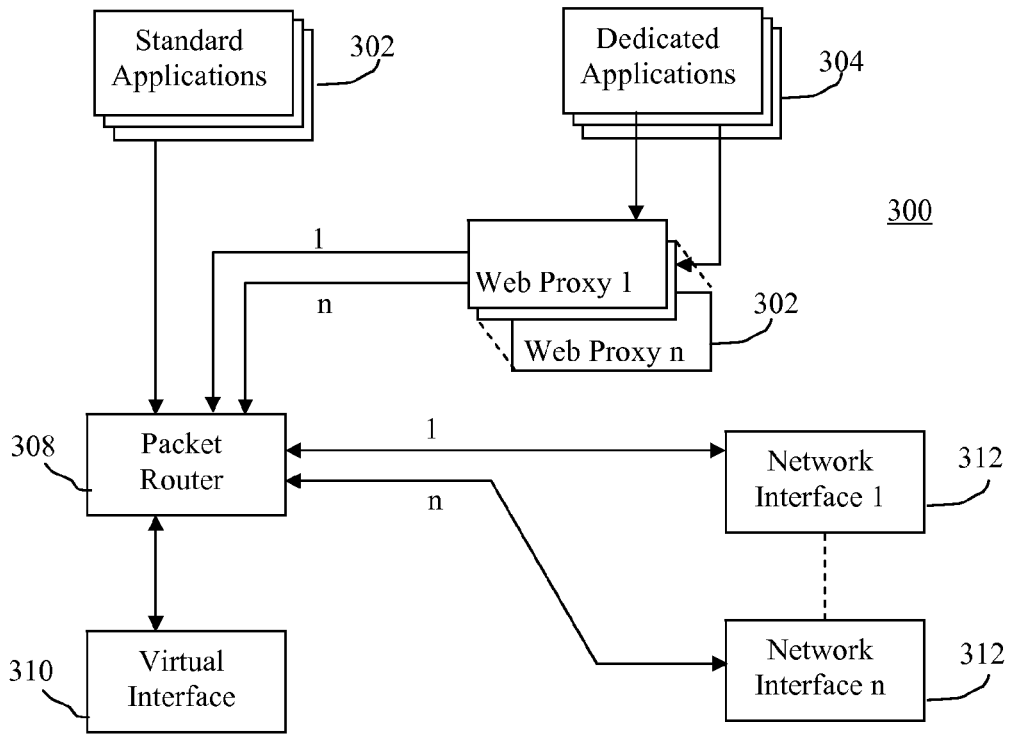
FIG. 3 is a block diagram illustrating components implemented at a client device to facilitate selective offload from a tunnel provided in the multi-interface network environment.

Referring to FIG. 3, software modules executing on the client device 102 in accordance with one embodiment of the invention are illustrated generally by numeral 300. The software modules include standard applications 302, dedicated applications 304, a plurality of web proxies 306, a packet router 308, a virtual interface 310, and a plurality of network interfaces 312. The network interfaces 312 are the components of the client device 102 that connect to the network access points 104 and 106 as illustrated in FIG. 1.

The standard applications 302 are configured to transmit data across the network 108 using the multi-interface system. Accordingly, the packet router 308 is configured to transmit data packets from the standard applications 302 to the virtual interface 310 for encapsulation and scheduling across the plurality of network interfaces 312.

The dedicated applications 304 are configured to transmit data to one of the web proxies 306. Each of the web proxies 306 are configured to correspond with one of the network interfaces 312. Thus, the web proxy 306 for which the dedicated application 304 is configured to transmit data is selected based on the target network interface 312. Further, the web proxies 306 use standardized proxy protocols, like SOCKS for example, to communicate with the preconfigured applications 304, thus allowing standard network libraries to be used. Each web proxy 306 can support many preconfigured applications 304, allowing multiple preconfigured applications to access local network resources at any time.

The packet router 308 includes a routing table and is configured to receive data from the web proxies 306 and transmit it to the corresponding network interface 312, bypassing the virtual interface 310. Thus, the dedicated applications 304 can transmit data outside of the multi-interface system.

Continuing the previous example of a captive portal being used to validate the user on a Wi-Fi network, a dedicated web-browser can be provided to authenticate the user of the client device 102 to a Wi-Fi access point. When the client device 102 initially attempts to establish a connection using the Wi-Fi interface, it determines that it is being directed to a portal using any one of a number of known portal detection schemes. The user is notified that the connection to the Wi-Fi access point cannot be established and is directed to use the dedicated web-browser. Using the dedicated web-browser, the data is transmitted, via the corresponding web proxy 306, to the packet router 308. The packet router 308 identifies the data as coming from the web proxy 306 associated with the Wi-Fi interface 312 and routes the data accordingly. Since the data bypasses the virtual interface 310, the user is able to authenticate him or herself and the client device 102 can establish the connection using the Wi-Fi interface. From this point forward, the user can use the standard applications 302, unless it is desired to access other local resources provided by the network server 109*b*. During this time, other standard applications 302 continue to use the virtual interface 310 without interruption. That is, traffic will continue to be transmitted to the 3G interface 312 until the Wi-Fi interface 312 can establish the connection with the Wi-Fi access point.

Other dedicated applications 304 can be used to access the network resources in a similar manner to the dedicated web-browser. For example, instead of a web proxy, other application protocols could be supported by implementing proxy applications for them. A similar infrastructure to that described above, including a dedicated application configured to communicate with an application-specific proxy, could be used to communicate with the packet router 308.

Figure 4:
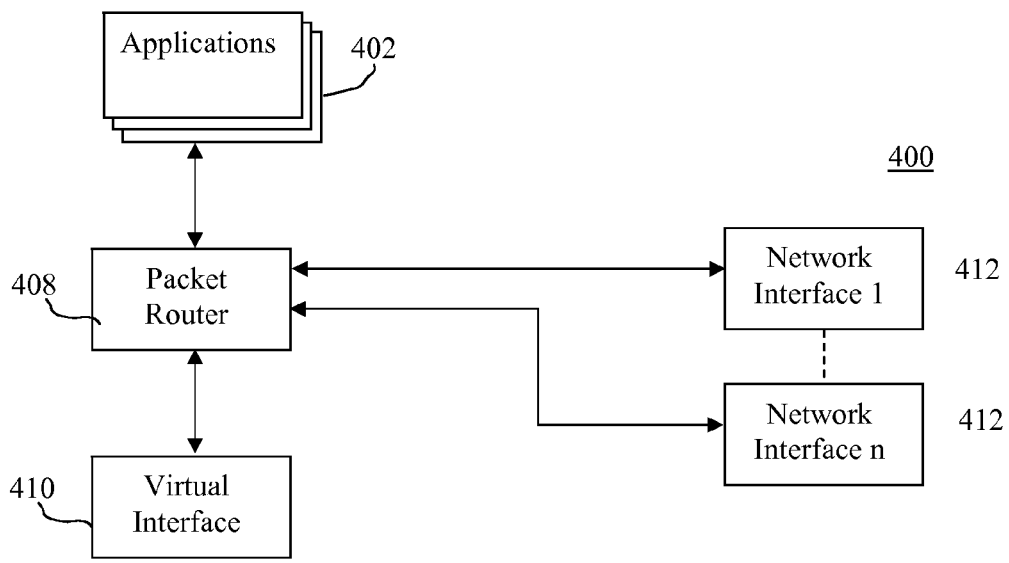
FIG. 4 is a block diagram illustrating components implemented at a client device to facilitate selective offload in accordance with an alternate embodiment.

Referring to FIG. 4, software modules executing on the client device 102 in accordance with a second embodiment of the invention are illustrated generally by numeral 400. The software modules include applications 402, a packet router 408, a virtual interface 410, and a plurality of network interfaces 412. Unlike the previous embodiment, the present embodiment does not use web proxies 306 to offload traffic from the tunnel. Rather, in the present embodiment, the virtual interface is configured to rewrite the packet source address, thereby affecting the packet routing, as will be described below.

The virtual interface 410 is configured with a static, private Internet protocol (IP) address, such as 192.168.1.1/24 for example. The IP address assigned to the virtual interface is different from the IP addresses on all other network interfaces. In the present embodiment, the IP address for the Wi-Fi interface is 1.1.1.1/24 and the IP address for the 3G interface is 2.2.2.2/24.

The virtual interface 410 is also configured with a subnet mask that allows for a greater number of IP addresses than there are network interfaces 412. Each of the network interfaces 412 are mapped to one of the addresses in the subnet defined by the subnet mask. For example, a Wi-Fi interface and a 3G interface could be mapped to IP addresses 192.168.1.2 and 192.168.1.3, respectively. These mapped addresses are not actually assigned to the network interfaces 412, they are just stored in a mapping table in the virtual interface for later use when assigning packets to the network interfaces 412.

The packet router 408 includes a routing table. Referring to Table 1 below, a sample routing table is shown. The packet router 408 is configured to route packets originating from IP address 192.168.1.2 to the Wi-Fi interface and packets originating from IP address 192.168.1.3 to the 3G interface. The packet router 408 is further configured to route packets to either the Wi-Fi interface or the 3G interface if that is, in fact, their actual destination. Remaining packets are routed to the virtual interface 410.

TABLE 1

| Packet Source Address | Packet Destination Address | Destination Network Interface |
| --- | --- | --- |
| Any | Any | Virtual Interface |
| Any | 192.168.1.1/24 | Virtual Interface |
| Any | 1.1.1.1/24 | Wi-Fi Interface |
| Any | 2.2.2.2/24 | 3G Interface |
| 192.168.1.2 | Any | Wi-Fi Interface |
| 192.168.1.3 | Any | 3G Interface |

In the context of an encapsulation system where encapsulated packets are passed to the proxy server 209, the virtual interface 410 is able to communicate directly with the proxy server 209 over the network interfaces 412 by setting a specific route to the IP address of the proxy server 209 on the particular network interface 412 by which the traffic should leave. This is known as a host route. The host route forces all traffic destined to the IP address of the proxy server 209 out of the network interface 412, because it is evaluated as being more specific than the default route, which directs all other traffic to the virtual interface 410. The virtual interface 410 sets the host routes on startup, allowing it to communicate directly with proxy server 209. If the client device 102 is expected to have multiple interfaces 412, then the network server 209 will be configured with one IP address per network interface 412, allowing the virtual interface 410 to communicate directly with proxy server 209 over each network interface 412, as each network interface 412 will have a host route to a different IP address on the proxy server 209. This allows the virtual interface 410 to select which network interface 412 the tunnelled traffic will leave by sending the packets destined to the relevant IP address specified in the host route on the relevant network interface 412.

For example, if the proxy server 209 has been assigned the addresses 172.20.0.1 and 172.20.0.2, the client 102 would update the routing table shown in Table 1 to include 2 additional entries, as shown in Table 2. This forces any traffic destined to the first address, 172.20.0.1, to leave via the Wi-Fi interface, and any traffic destined to the second address, 172.20.0.2, to leave via the 3G interface. This makes it possible for the encapsulation system running on client 102 to schedule encapsulated packets out either the 3G or the Wi-Fi interface.

TABLE 2

| Packet Source Address | Packet Destination Address | Destination Network Interface |
| --- | --- | --- |
| Any | 172.20.0.1/32 | Wi-Fi Interface |
| Any | 172.20.0.2/32 | 3G Interface |

Further, each network interface 412 is configured with a network address translation (NAT) rule which specifies that all of the packets leaving the network interface 412 will have their source address replaced with the actual IP address of the network interface 412. This rewriting substitution is performed by the client device 102, using a firewall or other similar packet manipulation mechanism, for example.

When the application 402 sends a packet, the use of a default routing rule will cause the packet to be routed to the virtual interface 410. Once the virtual interface 410 has received a packet, it processes the packet, classifies the packet into one of several categories, and then determines over which network interface 412 the packet should be sent.

If the packet does not need to be offloaded, it is encapsulated and scheduled as defined by the virtual interface 410. If, however, the packet needs to be offloaded to access the local services provided by the network servers, the source address of the packet will be rewritten from the IP address assigned to the virtual interface 410 to the virtual IP address that has been mapped to the corresponding network interface 412. Continuing the above example, the address for Wi-Fi would be rewritten to 192.168.1.2, and the address for 3G would be rewritten to 192.168.1.3.

Figure 5A:
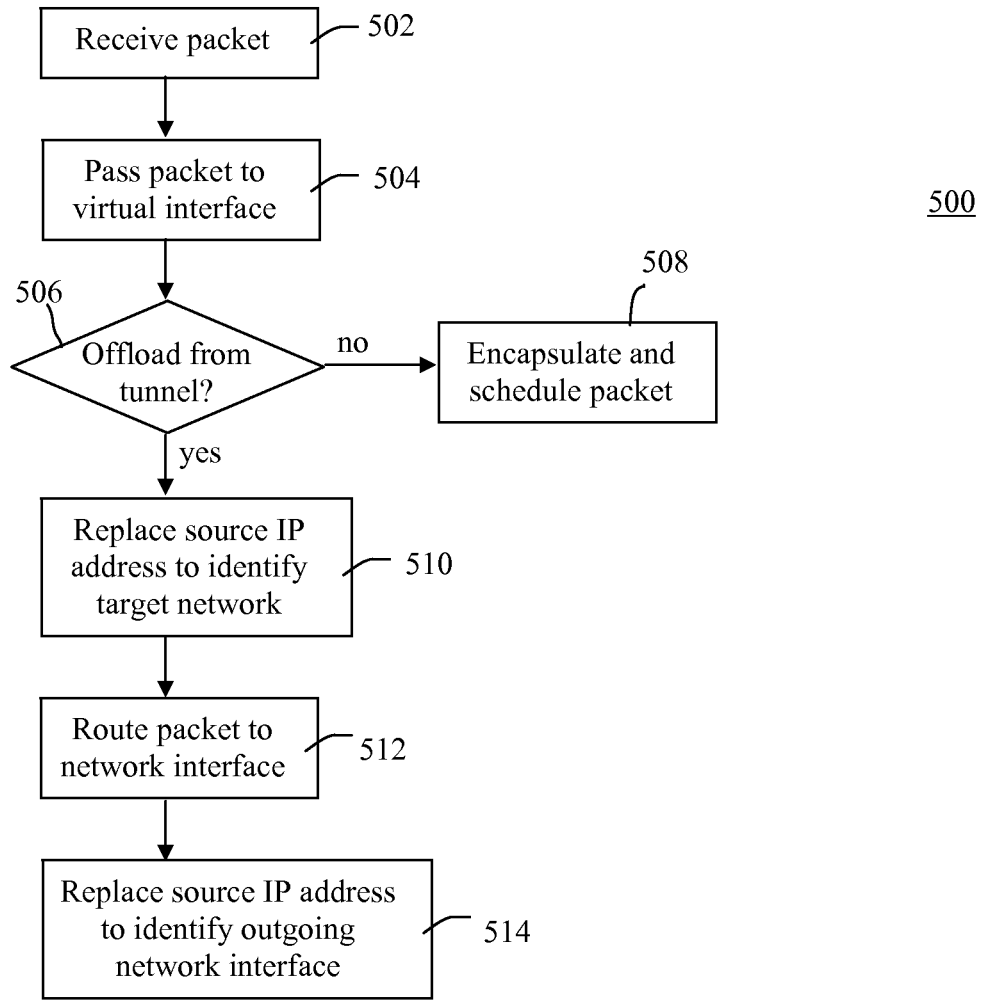
FIGS. 5*a* and 5*b* are flow charts illustrating sample steps implemented at the client device illustrated in FIG. 4.

Referring to FIG. 5a, a flow chart illustrating steps taken by the client device 102 to rewrite the source address for transmitting the packet is illustrated generally by numeral 500. Continuing the previous example, at step 502, a packet is received at the packet router 408 having a source IP address of 192.168.1.1. At step 504, the packet is passed to the virtual interface 410 accordingly based on the routing information defined in Table 1.

At step 506, it is determined whether or not the packet is to be offloaded from the tunnel. The process of determining whether to offload a packet from the tunnel can be controlled using a variety of settings that are configured via a policy applied either locally or remotely. It is possible to select packets that are to be offloaded from the tunnel based on the protocol type, the destination IP address of the packet, the originating application of the packet, the destination port of the packet, or any other field in the packet. It is also possible to use any attribute of the packet, including size, frequency of arrival, or other attribute not necessarily encoded in the packet.

Continuing the previous example of the Wi-Fi portal, it is possible for the network interface to look up the originating process of each connection, and map a custom web browser used to communicate with the portal to a specific IP address and port. This can be done by examining the list of open sockets and mapping the socket the packet came from with the process ID associated with the originating socket. Next, the process ID is mapped to the name of the application which is associated with this process ID. Using a specific application with a known piece of information about it, including name, user ID, binary image, or any other process identifier, makes it possible to determine if a packet is coming from a socket owned by the specific web browser that is handling the Wi-Fi portal communication. When the system sees packets matching this IP and port, it is possible to route them out the Wi-Fi interface while sending all other traffic over the existing 3G interface by rewriting the source address of this packet to the address that is mapped to the Wi-Fi interface, while rewriting the source address of all other packets to the address that is mapped to the 3G interface. Continuing the previous example, packets from the custom web browser handling Wi-Fi portal communications would have their source address rewritten to 192.168.1.2 to direct them to the Wi-Fi interface, while all other packets would have their source address rewritten to 192.168.1.3 to direct them to the 3G interface.

Extending on the previous mechanism of mapping a packet to a process, another example of mapping an incoming packet to a process could use a kernel module or kernel driver that would be able to determine the origin process of a packet. Mapping a packet to a process is known in the art, and is used by the Windows kernel to implement application-based firewalls. Yet another mechanism to accomplish this would be to extend the IP stack to add hooks to expose which process has created each socket. Further, it would be possible to replace the entire IP stack with one optimized to provide this information to the virtual interface for simplified packet to process matching.

If the packet is not to be offloaded, then at step 508, the packet is encapsulated and scheduled to be transmitted across the tunnel. If the packet is to be offloaded to the Wi-Fi interface, then at step 510 the source IP address will be rewritten to 192.168.1.2 by the virtual interface 410 to make it appear that the packet originated from that IP address. This operation may require certain checksums to be recalculated, based upon the structure of a header containing the IP address that was changed.

At step 512, the packet is sent back to the packet router 408. The packet router 408 examines the new packet, determines that it originated from IP address 192.168.1.2, and passes the packet to the Wi-Fi network interface. At step 514, the packet passes through the OS-specific NAT mechanism, and its source address is rewritten again, this time to contain the actual IP address of the Wi-Fi interface 412. From this point on, the packet appears to have come directly from the Wi-Fi interface, and is transmitted on to the network 108 as normal.

Figure 5B:
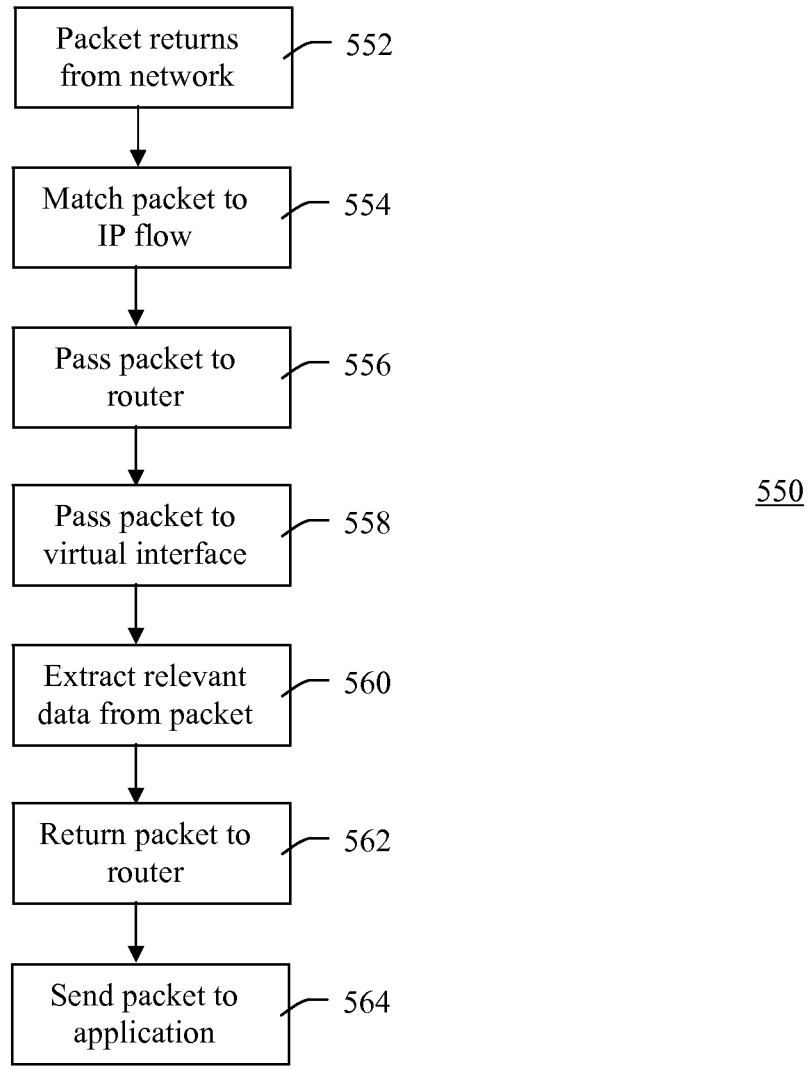

Referring to FIG. 5b, a flow chart illustrating steps taken by the client device 102 to rewrite the source address for a received packet is illustrated generally by numeral 550. At step 552, after some period of time, a packet returns from the network 108, and is received by the Wi-Fi interface. At step 554 the system determines that the packet matches a flow for which it is performing address rewriting. This is accomplished using an internal table that contains all outgoing flows that have been rewritten, and the packet is matched against this table. This precise step will vary based upon the implementation of the NAT, and the details of NAT design are known to those skilled in the art. The NAT changes the destination address of the arriving packet to the mapped IP address of the Wi-Fi interface, which is 192.168.1.2. At step 556, once the address has been rewritten, the packet is passed to the packet router 408. At step 558, the packet router sends the packet to the virtual interface 410, based on the routing table. At step 560, the virtual interface 410 examines the packet, records any relevant information about the packet, and rewrites the destination address to be 192.168.1.1. At step 562 the packet is passed back to the packet router 408, which recognizes that the packet is destined for an open application socket, and at step 564 sends the packet to the application 402.

However, some operating systems may not be able to readily replace source and destination IP address as described above. Accordingly, in a third embodiment, IP header-fields other than the IP address can be used to manipulate routing decisions. For example, the Linux kernel enables packet routing based not only upon the IP address, but also on other fields such as the Terms of Service (ToS) fields in an IP packet. By mapping different values to the ToS fields, it is possible to route packets in a similar manner as discussed above with regard to IP address replacement. Thus, client devices 102 that do not support source address routing may be similarly configured, but using a different IP header field that is supported. This can be extended to include classifying packets based on any field in the packet, using Layer 7 inspection. Prepending a custom header, which is ignored by the network interface 412, would make it possible to route the packet based on any field in the packet without modifying the packet itself.

Further, on some operating systems, it is possible to mark a packet in an out-of-band manner, that the packet router 408 would use to determine which interface 412 the packet should be sent to. This would enable the virtual interface 410 to route packets using any field in the packet in systems that might not otherwise support routing based upon source IP addresses.

In a fourth embodiment, the virtual interface 410 is set as a default interface for the client device 102. Accordingly, the virtual interface 410 captures all of the traffic generated from or destined for the applications 402 and acts as a transparent protocol proxy. When a connection is made from a client application 402 to a destination server 110, the virtual interface 410 will see the connection request message. Instead of forwarding this connection request on, the virtual interface 410 will respond to the client application 402 as if it were the destination server 110. Concurrently, the virtual interface 410 will establish a connection to the destinations server 110 over one of the specific network interfaces. This connection request will be properly routed because the connection from virtual interface 410 will originate from the source of the network interface 412 which this connection has been determined to be assigned to. This assignment is performed in the same manner described in previous embodiments. The use of the previously discussed source address routes will ensure this packet is routed to the proper network interface. The virtual network interface 410 will then route any incoming data from application 402 over the newly established connection between virtual network interface 410 and the destination server 110.

As an example of the above embodiment, when a TCP connection is made to a target server 8.8.8.8 by a web browser, the virtual interface 410 will receive a TCP SYN packet, and send a TCP SYN-ACK back to the application. At the same time, the virtual interface 410 will establish an independent TCP connection to the target server 8.8.8.8 originating from the Wi-Fi interface because this connection has been determined to be one with a captive portal. Once the web browser starts passing traffic to the virtual interface 410, it will use the newly created TCP connection with 8.8.8.8 to pass the traffic to the server over the Wi-Fi network interface. It appears as though the virtual interface 410 initialized the connection from the perspective of the server 8.8.8.8, but from the application's perspective it is communicating directly with the server and not the virtual interface 410.

In this embodiment, the virtual interface 410 will see all of the traffic that passes between the application 402 and the network server 110. This allows the virtual interface 410 to record what each application 402 is doing, monitor communication behaviour for congestion, latency, and the like, and make advanced scheduling decisions to potentially move the communication to another network interface 412 if the observed network parameters suggest this is necessary. It is not sufficient for each application 402 to add a host route to the network server 109 out the specific interface 412 the application 402 wishes to use. In this case, if there exists a host route to the network server 109 out a specific network interface 412, then the virtual interface 410 would not see any of traffic as it would pass directly out the specified network interface. This is because a host route takes precedence over the default route to the virtual interface 410. Thus, the embodiment of using virtual interface 410 as an IP proxy instead of simply using host routes for every network server 109 enables the virtual interface 410 to see all of the packets without issue.

Optionally, the virtual interface 410 can probe out different network interfaces 412 to determine with which network interface 412 the destination server 110 is associated. If the client is attempting to communicate with a destination server 110 on a network different from the proxy server 209, it is possible the destination server 110 may not available through the encapsulation tunnel. Accordingly, the traffic should be routed via the first access point 104 or the second access point 106. It may also not possible to know a priori which of the first access point 104 or the second access point 106 can access the destination server 110, if it can be access at all.

By having the virtual interface 410 act as a transparent protocol proxy, it will appear to the application 402 that a connection to the destination server 110 has been made. In the meantime, the virtual interface 410 attempts to connect to the destination server via the network interface 412. If any of the network interfaces 412 successfully facilitate a connection to the destination server 110, then the traffic can be exchanged with the application 402. If none of the network interfaces are able to facilitate a connection with the destination server 110, the virtual interface 410 sends a close message to the application 402 and it will appear to the application as if the destination server 110 closed the connection prior to sending any data. In both cases, it is transparent to the application 402.

In a fifth embodiment a similar paradigm of capturing all of the outbound network traffic at the virtual interface 410 is described. However, instead of writing specialized routing rules to route packets to the proper network interfaces 412, a kernel module is used to write packets directly to the network interface 412. This behaviour uses the same metrics for identifying packets as belonging to a particular flow, however instead of manipulating the routing table in the packet router 408 to have the packet be sent to a specific network interface the kernel module is able to write the packet directly to the network interface driver using functions that are only exposed in the kernel of the operating system. This enables the system to bypass the routing decisions that are made, ensuring that the packets are sent out the proper network interface 412 without manipulating the routing table. Each packet has its source address modified prior to writing it to the network interface 412, to ensure that the returning packets are properly processed by the virtual interface 410 before they continue on to the application 402. The use of NAT is maintained, as the address rewriting rules are typically applied immediately before the packet is sent out network interface 412. Since the source address was rewritten, once the returning packets have been translated through the NAT rule they are passed to the virtual interface 410 for inspection before they are passed on to the application 402.

Further, in addition to multi-interface communications systems, client devices that are equipped with multiple network interfaces but only transmit on a single interface need to decide which interface will be used to transmit traffic. Traditional scheduling algorithms for multi-interface client devices simply select the lowest cost interface to use, and all traffic generated by the client device is sent out the lowest cost interface. Examples of this approach can be found in the Android, iPhone, and Windows Phone 7 network interface selection algorithm. In these systems, the operating system chooses the lowest cost interface, and then disables all the other available interfaces, making it appear to applications on the device that there is only a single interface. Unfortunately, this process prevents the client device from accessing network resources that are only accessible via networks that are connected to one of the network interfaces not selected for use. Here, the local resources are inaccessible not because the traffic is routed through an encapsulation system to a network endpoint that is independent of the client, but because the client is no longer connected to the other local networks due to the operation of the operating system. In this case, the cause of the inaccessibility is different, but the end result is the same; client devices may be denied access to resources they would otherwise be able to access.

Therefore, in a sixth embodiment, packets can be routed to one of the first access point 104 or the second access point 106 without the presence of a multi-interface communication system that uses encapsulation. Here, as in the previous embodiments, packets are read from a virtual network interface 410 and are scheduled across one of the available network interfaces 412. However, instead of evaluating the rule 506 as to whether or not the packet should be offloaded from the tunnel, step 504 proceeds directly to step 510 whereby the source IP address of the packet is replaced to identify the target network interface of the device. This allows client applications running on a multi-interface network system to obtain the advantages of per-interface scheduling without requiring the presence of an encapsulation system. In this embodiment, it may be necessary for the virtual interface 410 to override the default behaviour of the operating system in order to keep all of the network interfaces 412 active. Thus, applications are able to access local network resources that would not otherwise be available due to the default behaviour of the network selection algorithm on devices not running a multi-interface encapsulation system.

In the embodiments described above, the routing logic is implemented as part of the virtual interface 310, 410. A skilled person in the art will appreciate that this is not a limitation. Rather, the routing logic may also be implemented on its own or as part of another device or module and is in communication with the virtual interface 310, 410 to instruct it accordingly.

Using the foregoing specification, the invention may be implemented as a machine, process or article of manufacture by using standard programming and/or engineering techniques to produce programming software, firmware, hardware or any combination thereof.

Any resulting program(s), having computer-readable instructions, may be stored within one or more computer-usable media such as memory devices or transmitting devices, thereby making a computer program product or article of manufacture according to the invention. As such, the term "software" or "modules" as used herein is intended to encompass a computer program existent as instructions on any computer-readable medium such as on any memory device or in any transmitting device, that are to be executed by a processor.

Examples of memory devices include hard disk drives, diskettes, optical disks, magnetic tape, semiconductor memories such as FLASH, RAM, ROM, PROMS, and the like. Examples of networks include, but are not limited to, the Internet, intranets, telephone/modem-based network communication, hard-wired/cabled communication network, cellular communication, radio wave communication, satellite communication, and other stationary or mobile network systems/communication links. The client device 102 does not need to be mobile and the first and second access points 104 and 106 do not need to provide a wireless connection to the network.

A machine embodying the invention may involve one or more processing systems including, for example. CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

Using the description provided herein, those skilled in the art will be readily able to combine software created as described with appropriate general purpose or special purpose computer hardware to create a computer system and/or computer subcomponents embodying the invention, and to create a computer system and/or computer subcomponents for carrying out the method of the invention.

Although preferred embodiments of the invention have been described herein, it will be understood by those skilled in the art that variations may be made thereto without departing from the scope of the appended claims.

What is claimed is:

1. A method for selectively routing data packets on a client device having of plurality of network interfaces for communicating over a network, the method comprising the steps of:
    inserting a routing address into a header field of the data packets so that they are routed to a routing logic module;
    determining, at the routing logic module, if the data packets should be routed to a network server accessible by a corresponding one of the network interfaces to access local resources offered thereon;
    if the data packets should be routed to the network server:
        modifying the routing address to a virtual interface address for identifying the corresponding network interface; and
        routing the data packets directly to the network server via the corresponding network interface until it is determined that local resources no longer need to be accessed;
    otherwise, routing the data packets via a default route.

2. The method of claim 1, wherein the default route is selected by an operating system executing on the client device based on a number of predefined parameters.

3. The method of claim 1, wherein the default route is selected by an encapsulation system executing on the client device based on a number of predefined parameters.

4. The method of claim 1, wherein the step of routing the data packet directly to the network server via the corresponding network interface is performed by executing a dedicated application on the client device for transmitting the data packets, the dedicated application being configured to identify the corresponding network interface.

5. The method of claim 4, wherein the dedicated application is configured to communicate with a proxy application on the client device based on the corresponding network interface, and the data packets are routed to the corresponding network interface based on the proxy application from which they are received.

6. The method of claim 1 comprising the further step of modifying the virtual interface address to an actual address of the corresponding network interface when the data packet is transmitted from the client device.

7. The method of claim 1, wherein the header field is a source address field.

8. The method of claim 1 further comprising the step of acknowledging receipt of the data packets by the routing logic module.

9. A client device having of plurality of network interfaces for communicating over a network, the client device comprising:
    a non-transitory computer readable medium having stored thereon non-transitory computer readable instructions configured to selectively route data packets; and
    a processor configured to execute the non-transitory computer readable instructions to implement the steps of:
        inserting a routing address into a header field of the data packets so that they are routed to a routing logic module;
        determining, at the routing logic module, if the data packets should be routed to a network server accessible by a corresponding one of the network interfaces to access local resources offered thereon;
        if the data packets should be routed to the network server:
            modifying the routing address to a virtual interface address for identifying the corresponding network interface; and
            routing the data packet directly to the network server via the corresponding network interface until it is determined that local resources no longer need to be accessed;
        otherwise, routing the data packets via a default route.

* * * * *